Nov. 30, 1965 H. SCHOLL 3,221,235
OSCILLATOR CONTROLLED BY CENTRIFUGAL SWITCH FOR
REGULATING MOTOR SPEED
Filed Feb. 21, 1963
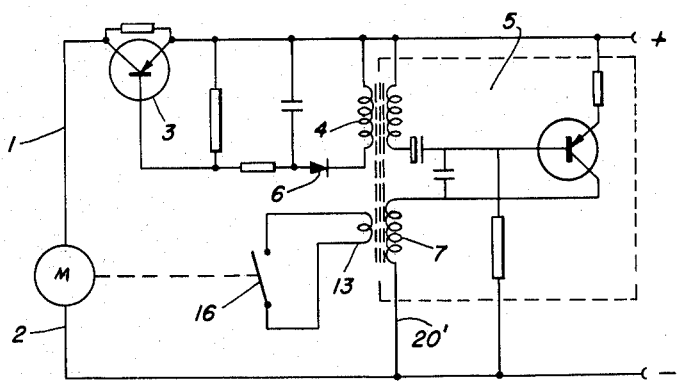
Fig. 1.
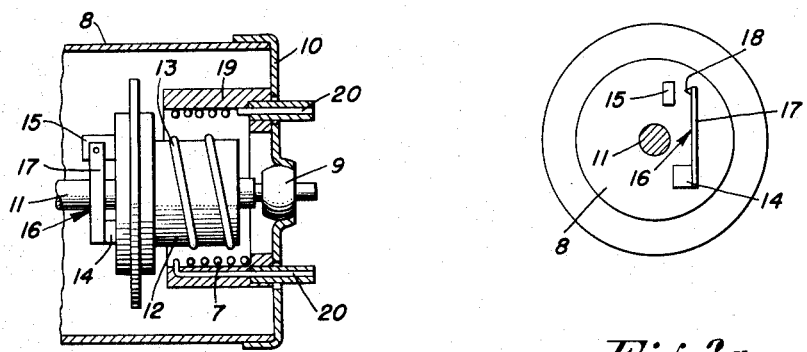
Fig. 2.
Fig. 2a.
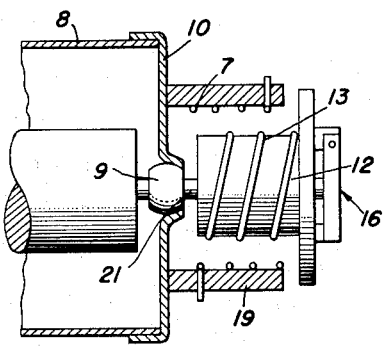
Fig. 3.
INVENTOR
HERBERT SCHOLL
BY Kenyon Palmer Stewart
& Estabrook
ATTORNEYS 了
United States Patent Office 3,221,235
Patented Nov. 30, 1965

3,221,235
OSCILLATOR CONTROLLED BY CENTRIFUGAL SWITCH FOR REGULATING MOTOR SPEED
Herbert Scholl, Nurnberg, Germany, assignor to Gebr. Bühler Nachfolger G.m.b.H., Nurnberg, Germany
Filed Feb. 21, 1963, Ser. No. 260,182
Claims priority, application Germany, Feb. 24, 1962,
B 66,085
10 Claims. (Cl. 318—325)

The invention deals with the problem of regulating and particularly maintaining constant the speed of direct current electric motors.

A number of arrangements for regulating the speed of electric motors are known which generally employ a centrifugal governor the contact of which opens when the rated speed is attained and closes when this speed again drops.

In the most simple case, the regulator of the motor is connected in series and if necessary bridged by a resistance. Owing to the contacts being extremely sensitive on account of the slight contacting pressures, this arrangement has not, however, proved satisfactory. Although by using switching transistors the loading of the regulating contact can be reduced to a fraction of the motor current, yet even then the necessary constancy in speed cannot be attained because, particularly after long service, the direct current loading of the contacts leads to manifestations of creep of material and under heavier load the contacts burn. Finally the reduction in voltage by means of brushes running on slip rings is open to numerous uncertainty factors, particularly as regards the contact resistance, which factors frequently lead to fluctuations in speed.

On the other hand, the characteristic of an oscillator is known, namely that it immediately ceases to oscillate when the oscillatory current is damped beyond a certain limit. This characteristic is utilized, for example, in sensitive rotary coil measuring apparatus which have for this purpose a sheet-metal lug which, on reaching a certain position, dips into the field of the coil of a high-frequency generator. As a result, the oscillator ceases to function and the switching operation is initiated. This arrangement cannot, however, be applied in the present instance for the speed regulation of a direct current motor.

The object of the present invention is to produce an apparatus which, while avoiding the numerous sources of failure of the known regulating devices, can nevertheless meet the most exacting demands.

This object is attained according to the invention by the provision of an oscillator capable of being damped under the influence of the rotary armature and the output voltage of which controls the motor circuit. The speed of the armature therefore directly effects the damping of the control element (the oscillator) which in turn acts on the motor circuit to vary the speed in the desired manner. The use of a high-frequency generator results in an extremely reliable method of operation.

It has been found particularly practical to provide according to the invention a damping coil influenced by the armature as a means of attenuation or stopping the oscillator. For the damping coil of the oscillator, a coil rotating with the armature may be provided and is magnetically coupled with the oscillator circuit coil, the ends of the rotating coil being connected to the contacts of a centrifugal governor fixed on the armature. The oscillator immediately ceases to function when the centrifugal governor contacts are closed to short-circuit the damping coil which imposes a damping action on the oscillating circuit and stops the oscillating action. This centrifugal governor fors, under slight contact load, an extremely accurately operating speed gauge or feeler which interrupts the flow of current through the rotating coil immediately the rated speed is reached, thereby removing the damping on the oscillator which will then generate oscillations until the contacts close again.

According to another feature of the invention, the oscillatory circuit coil may be stationary and mounted in the field of the damping coil rotating with the armature. This arrangement is both simple and reliable.

Another embodiment of this idea is to arrange the oscillatory coil above the rotating damping coil or within 5 in.

The apparatus according to the invention may, for example, be constructed so that the rotating damping coil is mounted on a coil carrier fixed on the armature shaft.

This coil carrier may be located either within the motor housing or, alternatively, it may be fitted on the end of the armature shaft extending beyond the bearing bracket of the motor. This arrangement has important economical advantages because the conventional motors may be used and only the armature shafts need be of different size to provide such a direct current motor with the new speed regulation, if desired.

According to another feature of the invention the oscillating coil is arranged on a hollow cylindrical holder concentrically surrounding the coil carrier and which, according to a preferred embodiment of the invention is in turn fixed on the bearing bracket of the motor. As the control voltage obtained in this manner (supplied from the oscillator) is naturally an alternating current voltage, a rectifier is provided in the motor circuit controlled by the oscillator. Finally the motor circuit controlled by the oscillator has a switching transistor which is controlled by the rectifier. Another possibility according to the invention consists in providing in the motor circuit controlled by the oscillator a control relay which may be polarized.

Further features, details and advantages of the invention will become apparent from the following description of a preferred form of construction illustrated by way of example in the accompanying drawings in which:

FIG. 1 is a circuit diagram of the apparatus;

FIG. 2 is a diagrammatic view showing the coil mounting arrangement partly in section and partly in elevation, and FIG. 2a is a view of FIG. 2 from the left end showing certain details of the speed governor;

FIG. 3 is a similar view to FIG. 3 of a modification of the coil arrangement.

The direct current motor designated by M is fed with current by the wires 1 and 2 which in turn are connected to a source of current not shown. In the motor circuit a switching transistor 3 is arranged to which the output voltage of the oscillator, designated as a whole by 5, taken from the coil 4 is fed after being rectified by a rectifier 6. The oscillator is of conventional type. The oscillatory circuit includes a coil 7 which is coupled to a damping coil 13 as explained below. On the armature shaft 11 mounted at 9 in the bearing bracket or plate designated by 10, the cylindrical coil carrier 12 is fixed. This carrier supports the damping coil 13 composed of a multi-turn coil which is coupled magnetically to the oscillator coil 7 and rotates with the armature of the motor M not shown in detail. The ends of this rotating coil 13 are connected to two terminals 14, 15 of a centrifugal governor 16 which are shown in open position in FIG. 2. This centrifugal governor 16 is mounted on the end face of the carrier 12 adjacent the motor armature and has a spring arm 17 fixed at one end to terminal 14 while its free end carries a closing contact 18 positioned to engage terminal 15.

The coil carrier 12 is surrounded by a hollow cylinder 19 open at one end and fixed at the other end to the bearing plate 10 of the motor, which cylinder carries on its inner wall the oscillatory coil designated by 7 in concentric arrangement with the rotary coil 13. The wires connected to coil 7 pass through the bearing plate 10 and are designated by 20, the wire 20' (FIG. 1) serving for connecting the oscillator 5 to the network.

From the foregoing description, it will be understood that the operation of the arrangement illustrated in FIGURE 1 is as follows:

Normally the motor M is supplied with current through transistor 3, which acts as a current regulator. When the motor M is not operating, or is operating below the desired speed, the switch 16 is closed which short-circuits the damping coil 13, thereby imposing a damping action on the oscillator 5 through the oscillator coil 7, and the oscillator remains dormant so long as the switch 16 is closed.

When the motor speed reaches or exceeds the desired value, the switch 16 opens and thereby removes the damping action on the oscillator coil 7, so that the oscillator begins oscillating and supplies an alternating current output voltage at the terminals of winding 4. This output voltage is rectified by the rectifier 6 and is supplied through a filtering network to the control electrode of the regulating transistor 3. The action of this transistor is to reduce the current supplied to the motor M and thereby reduce the speed of the motor to a point where the switch 16 is again closed. This stops the operation of the oscillator 5 which interrupts the controlling action of the transistor 3. The cycle of operation described above will be repeated in successive cycles so long as the motor tends to operate at a speed above that required to open the switch 16.

In the form of construction illustrated in FIG. 2, the holder 19 is accommodated with the oscillatory coil 7 inside the motor housing 8. On the other hand FIG. 3 shows a coil carrier 12 with the damping coil 13 mounted on the end 21 of the motor shaft extending beyond the bearing plate 10 in combination with a holder 19 fixed on the outer side of the bearing plate 10 and carrying the coil 7 on the inner surface thereof.

What I claim is:

1. Apparatus for regulating the speed of a direct current motor having a rotary armature, comprising, in combination, a current regulator controlling the current supplied to the armature, an attenuatable oscillator supplying current to control said regulator for reducing the current supplied to the armature, damping means for acting on said oscillator to stop oscillation thereof, and means responsive to the speed of said armature and being effective at a predetermined speed to render said damping means effective to stop said oscillator.

2. Apparatus according to claim 1, wherein said damping means comprises a damping coil coupled to the oscillator and influenced by the armature serves as means for attenuating the oscillator.

3. Apparatus according to claim 2, wherein said damping coil is mounted to rotate with the armature and is coupled to the oscillatory coil of the oscillator, the ends of said damping coil being connected to the contacts of a centrifugal governor rigidly mounted on the armature.

4. Apparatus according to claim 3, wherein the oscillatory coil is arranged within the rotary damping coil.

5. Apparatus according to claim 4, wherein the rotary damping coil is arranged on a coil carrier fixed on the armature shaft.

6. Apparatus according to claim 5, wherein the coil carrier is mounted on the end of the armature shaft extending beyond the bearing plate of the motor.

7. Apparatus according to claim 6, wherein the oscillatory coil is mounted on a hollow cylindrical holder concentrically surrounding the carrier.

8. Apparatus according to claim 7, wherein the holder is fixed on the bearing plate of the motor.

9. Apparatus according to claim 1, wherein a rectifier is connected in the regulator circuit controlled by the oscillator.

10. Apparatus according to claim 1, wherein the current regulator in the armature circuit comprises a switching transistor.

References Cited by the Examiner

UNITED STATES PATENTS

| | | | |
|---|---|---|---|
| 2,786,972 | 3/1957 | Dreier | 318—138 X |
| 2,995,690 | 8/1961 | Lemon | 318—341 X |
| 3,067,370 | 12/1962 | Quittner | 318—138 X |

ORIS L. RADER, *Primary Examiner.*